(12) United States Patent
Iguchi et al.

(10) Patent No.: US 11,118,805 B2
(45) Date of Patent: Sep. 14, 2021

(54) AIR-CONDITIONING APPARATUS FOR ENABLING UPDATED CONTROL DATA

(71) Applicant: Mitsubishi Electric Corporation, Tokyo (JP)

(72) Inventors: Keigo Iguchi, Tokyo (JP); Shigeo Takata, Tokyo (JP); Atsuhiro Yabuta, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 16/326,499

(22) PCT Filed: Nov. 8, 2016

(86) PCT No.: PCT/JP2016/083041
§ 371 (c)(1),
(2) Date: Feb. 19, 2019

(87) PCT Pub. No.: WO2018/087799
PCT Pub. Date: May 17, 2018

(65) Prior Publication Data
US 2020/0018510 A1    Jan. 16, 2020

(51) Int. Cl.
*F25B 49/02* (2006.01)
*F24F 11/64* (2018.01)
(Continued)

(52) U.S. Cl.
CPC ............ *F24F 11/64* (2018.01); *F24F 11/49* (2018.01); *F24F 11/88* (2018.01); *F25B 49/022* (2013.01); *F25B 2500/18* (2013.01)

(58) Field of Classification Search
CPC .. F24F 11/49; F24F 11/64; F24F 11/88; F25B 49/022; F25B 2500/18
See application file for complete search history.

(56) References Cited

U.S. PATENT DOCUMENTS 5,454,510 A * 10/1995 Manson ............ G05D 23/1905
236/46 R
6,126,080 A    10/2000 Wada
(Continued)

FOREIGN PATENT DOCUMENTS

JP    H10-122632 A    5/1998
JP    2007-071406 A    3/2007
(Continued)

OTHER PUBLICATIONS

Office Action dated Jan. 14, 2020 issued in corresponding JP patent application No. 2018-549645 (and English translation).
(Continued)

*Primary Examiner* — Jonathan Bradford
(74) *Attorney, Agent, or Firm* — Posz Law Group

(57) ABSTRACT

An air-conditioning apparatus includes a plurality of devices including at least a compressor, and a controller which stores device information indicating the kinds of the devices. The controller reads out a control parameter and a control program for a device which is indicated by kind by the device information, from an external storage device which stores control parameters and control programs for the devices, and controls the device in accordance with the control program.

11 Claims, 8 Drawing Sheets

(51) Int. Cl.
  *F24F 11/88* (2018.01)
  *F24F 11/49* (2018.01)

(56) References Cited

U.S. PATENT DOCUMENTS

2011/0218681 A1   9/2011   Jung et al.
2015/0308707 A1   10/2015  Tanaka et al.
2017/0314801 A1*  11/2017  Enya ........................ F24F 11/89

FOREIGN PATENT DOCUMENTS

JP   2016-084969 A   5/2016
JP   2016-151385 A   8/2016

OTHER PUBLICATIONS

International Search Report of the International Searching Authority dated Feb. 7, 2017 for the corresponding international application No. PCT/JP2016/083041 (and English translation).
Office Action dated Jun. 2, 2020 issued in corresponding CN patent application No. 201680089568.2 (and English translation).
Extended European Search Report dated Oct. 15, 2019 in corresponding EP application No. 16921040.8.

* cited by examiner

FIG. 6

| COMPRESSOR CONTROL PROGRAM | FAN CONTROL PROGRAM | EXPANSION VALVE CONTROL PROGRAM | FOUR-WAY VALVE CONTROL PROGRAM |
|---|---|---|---|
| 116A1 | 116B1 | 116C1 | 116D1 |
| 116A2 | 116B2 | 116C2 | 116D2 |
| 116A3 | 116B3 | 116C3 | 116D3 |

FIG. 7

| AIR-CONDITIONING APPARATUS | COMPRESSOR CONTROL PROGRAM | FAN CONTROL PROGRAM | EXPANSION VALVE CONTROL PROGRAM | FOUR-WAY VALVE CONTROL PROGRAM |
|---|---|---|---|---|
| STANDARD SPECIFICATIONS | 116A1 | 116B1 | 116C1 | 116D1 |
| COLD REGION SPECIFICATIONS | 116A1 | 116B1 | 116C2 | 116D2 |
| REFRIGERATOR SPECIFICATIONS | 116A2 | 116B1b | 116C2 | 116D2 |

AIR-CONDITIONING APPARATUS FOR ENABLING UPDATED CONTROL DATA

TECHNICAL FIELD

The present invention relates to an air-conditioning apparatus which controls a refrigeration cycle.

This application is a U.S. national stage application of PCT/JP2016/083041 filed on Nov. 8, 2016, the contents of which are incorporated herein by reference.

BACKGROUND ART

As an example of a conventional air-conditioning apparatus, an air-conditioning apparatus which controls a refrigeration cycle in accordance with a program is disclosed (for example, see Patent Literature 1). The air-conditioning apparatus of Patent Literature 1 controls a compressor and the rotation speed of a fan in accordance with a program stored in a storage unit.

CITATION LIST

Patent Literature

Patent Literature 1: Japanese Unexamined Patent Application Publication No. 2016-151385

SUMMARY OF INVENTION

Technical Problem

The air-conditioning apparatus disclosed in Patent Literature 1 operates in accordance with a single program which includes common functions regarding the control of a refrigeration cycle and inherent functions of devices. Therefore, each time a new model of air-conditioning apparatus is made, it is necessary to create a program for the new model. Accordingly, the number of models cannot be easily increased.

The present invention has been made to solve the above problem, and an object of the invention is to provide an air-conditioning apparatus which enables the number of models to be easily increased.

Solution to Problem

An air-conditioning apparatus according to an embodiment of the present invention includes a plurality of devices including at least a compressor, and a controller which stores device information indicating the kinds of the devices. The controller includes a program organizer which reads out a control parameter and a control program for a device which is indicated in kind by the device information, from an external storage device which stores control parameters and control programs for the devices, and a refrigeration cycle control unit which controls the device in accordance with the control program read out by the program organizer.

Advantageous Effects of Invention

In an embodiment of the present invention, a control parameter and a control program associated with each of devices provided in an air-conditioning apparatus are read out from an external storage device on the basis of device information. It is therefore possible to easily increase the number of models of air-conditioning apparatuses.

BRIEF DESCRIPTION OF DRAWINGS

FIG. 6 is a diagram illustrating an example of control programs prepared as control programs to be stored in the external storage device as illustrated in FIG. 1.

FIG. 7 is a diagram illustrating another example of the control programs to be stored in the external storage device as illustrated in FIG. 1.

DESCRIPTION OF EMBODIMENTS

Embodiment 1

Figure 1:
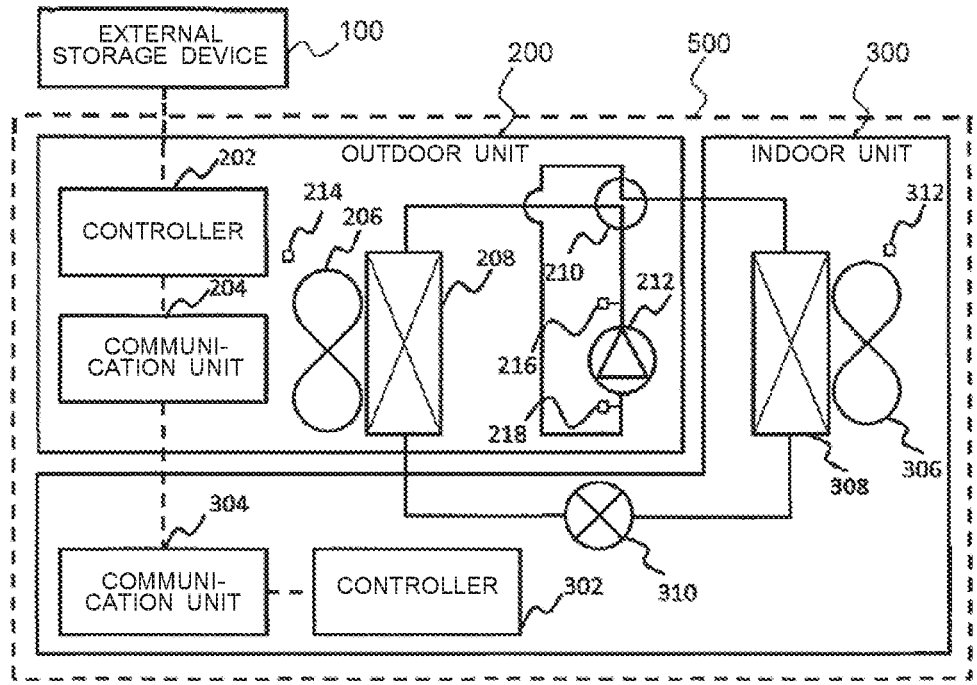
FIG. 1 is a block diagram illustrating an example of the configuration of an air-conditioning apparatus according to embodiment 1 of the present invention.

A configuration of the air-conditioning apparatus according to embodiment 1 will be described. FIG. 1 is a block diagram illustrating an example of the configuration of the air-conditioning apparatus according to embodiment 1 of the present invention. As illustrated in FIG. 1, the air-conditioning apparatus 500 includes an outdoor unit 200 and an indoor unit 300. The indoor unit 300 includes a controller 302, a communication unit 304, a fan 306, a load-side-heat exchanger 308 and an expansion valve 310. The indoor unit 300 is provided with an indoor temperature sensor 312 which detects the temperature of indoor space. The fan 306 sends indoor air to the load-side-heat exchanger 308.

The outdoor unit 200 includes a controller 202, a communication unit 204, a fan 206, a heat-source-side heat exchanger 208, a four-way valve 210 and a compressor 212. In the compressor 212, a discharge-port pressure sensor 216 is provided on a discharge-port side for refrigerant, and a suction-port pressure sensor 218 is provided on a suction-port side for refrigerant. In the outdoor unit 200, an outdoor temperature sensor 214 which detects the temperature of outdoor air is provided. The fan 206 sends outdoor air to the heat-source-side heat exchanger 208.

The refrigerant circuit is configured such that the load-side-heat exchanger 308, the expansion valve 310, the heat-source-side heat exchanger 208, the four-way valve 210 and the compressor 212 are connected by refrigerant pipes. In embodiment 1, the fan 306, the expansion valve 310, the fan 206, the four-way valve 210 and the compressor 212 are ones of devices related to a refrigeration cycle, that are to be controlled in accordance with a program.

The external storage device 100 as illustrated in FIG. 1 is removably connected to a connector not illustrated that is provided at the outdoor unit 200. The external storage device 100 is connected to the controller 202 by the connector provided at the outdoor unit 200. The external storage device 100 includes, for example, a non-volatile memory. It should be noted that the connector may also be provided at the indoor unit 300, and the external storage device 100 may be connected to the controller 302 by the connector.

Figure 2A:
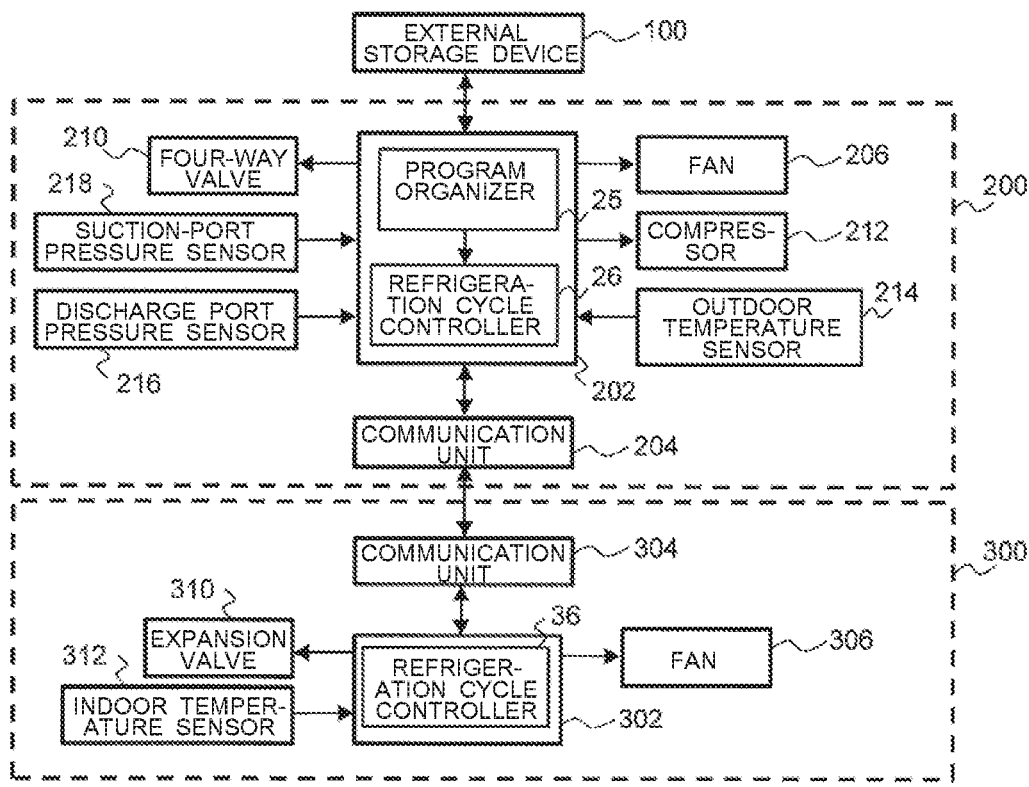
FIG. 2A is a function block diagram illustrating a configuration related to control in the air-conditioning apparatus as illustrated in FIG. 1.
Figure 2B:
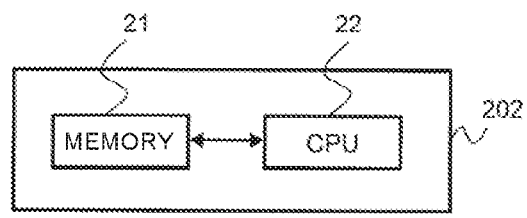
FIG. 2B is a diagram illustrating an example of the configuration of a controller of an outdoor unit as illustrated in FIG. 1.
Figure 2C:
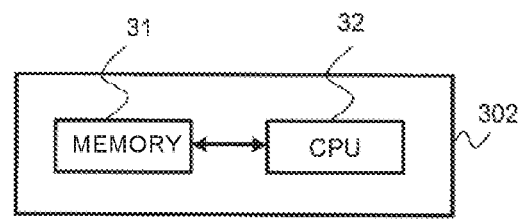
FIG. 2C is a diagram illustrating an example of the configuration of a controller of an indoor unit as illustrated in FIG. 1.

FIG. 2A is a function block diagram illustrating a configuration related to control in the air-conditioning apparatus as illustrated in FIG. 1. FIG. 2B is a diagram illustrating an example of the configuration of the controller of the outdoor unit as illustrated in FIG. 1. FIG. 2C is a diagram illustrating an example of the configuration of the controller of the indoor unit as illustrated in FIG. 1. As illustrated in FIG. 2A, the controller 202 is connected to the four-way valve 210, the fan 206, the compressor 212, the communication unit 204, the outdoor temperature sensor 214, the discharge-port pressure sensor 216 and the suction-port pressure sensor 218. The controller 302 is connected to the fan 306, the expansion valve 310, the communication unit 304 and the indoor temperature sensor 312. The communication unit 204 is connected to the communication unit 304. The controllers 202 and 302 are, for example, microcontrollers.

As illustrated in FIG. 2A, the controller 202 includes a program organizer 25 and a refrigeration cycle control unit 26. The controller 302 includes a refrigeration cycle control unit 36. As illustrated in FIG. 2B, the controller 202 includes a memory 21 and a central processing unit (CPU) 22. The memory 21 stores device information, which is information indicating the kind of each of devices provided in the outdoor unit 200. To be more specific, the memory 21 stores device information regarding each of the heat-source-side heat exchanger 208, the compressor 212, the fan 206 and the four-way valve 210. Information including the device information will be referred to as outdoor-unit connected-device information. As types of the compressor 212, for example, fixed capacity compressors and variable capacity compressors are present. The outdoor-unit connected-device information may also include information which identifies the outdoor temperature sensor 214, the discharge-port pressure sensor 216, and the suction-port pressure sensor 218. Also, the memory 21 stores a program for reading out a control program regarding each of the devices from the external storage device 100. When the CPU 22 executes the program, the program organizer 25 is provided in the controller 202.

As illustrated in FIG. 2C, the controller 302 includes a memory 31 and a CPU 32. The memory 31 stores device information, which is information indicating the type of each of devices provided in the indoor unit 300. The memory 31 stores device information regarding each of the fan 306, the load-side-heat exchanger 308, and the expansion valve 310. Information including the device information will be referred to as indoor-unit connected-device information. The indoor-unit connected-device information may also include information which specifies the type of the indoor temperature sensor 312.

The refrigeration cycle control units 26 and 36 control each of the devices related to the refrigeration cycle in accordance with the operating state of the air-conditioning apparatus 500. For example, in the case of performing a cooling operation, the refrigeration cycle control unit 26 sets the four-way valve 210 to cause it to use a flow passage in which refrigerant discharged from the compressor 212 flows through the heat-source-side heat exchanger 208, the expansion valve 310 and the load-side-heat exchanger 308 to return to the compressor 212. In the case of performing a heating operation, the refrigeration cycle control unit 26 sets the four-way valve 210 to cause it to use a flow passage in which refrigerant discharged from the compressor 212 flows through the load-side-heat exchanger 308, the expansion valve 310 and the heat-source-side heat exchanger 208 to return to the compressor 212. Also, in the cooling operation and the heating operation, on the basis of a set temperature and a detection value of each of sensors such as the indoor temperature sensor 312, the refrigeration cycle control unit 26 controls operating frequencies of the compressor 212 and the fan 206, and the refrigeration cycle control unit 36 controls an operating frequency of the fan 306 and an opening degree of the expansion valve 310.

It should be noted that although it is described above with reference to FIG. 2A that the refrigeration cycle control unit 26 controls the devices provided in the outdoor unit 200 and the refrigeration cycle control unit 36 controls those provided in the indoor unit 300, the refrigeration cycle control unit 26 may also control the devices provided in the outdoor unit 200 and the indoor unit 300. In this case, the controller 302 controls the expansion valve 310 and the fan 306 in response to instructions from the refrigeration cycle control unit 26. In addition, the memory 21 may also store the indoor-unit connected-device information in advance. Furthermore, in the case in which the external storage device 100 is connected to the controller 302, the program organizer 25 may be provided in the controller 302.

Figure 3:
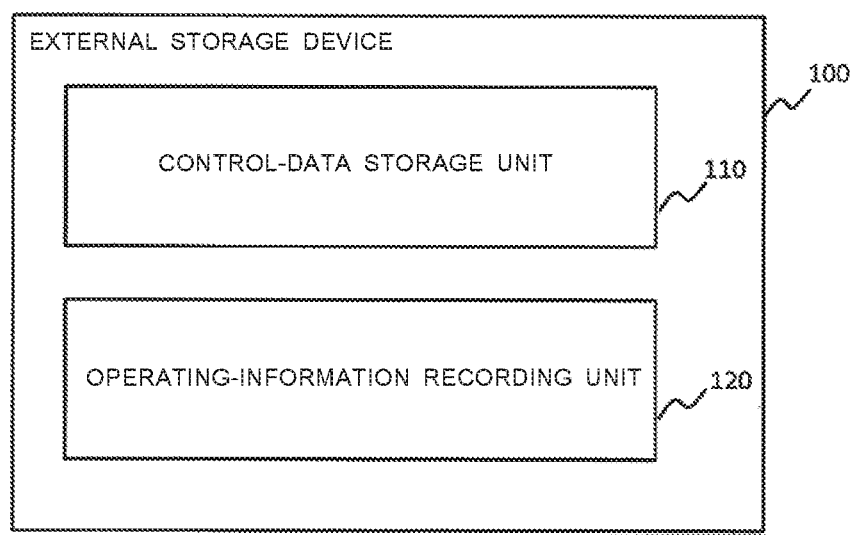
FIG. 3 is a block diagram illustrating an example of the configuration of an external storage device as illustrated in FIG. 1.

Next, the configuration of the external storage device 100 will be described. FIG. 3 is a block diagram illustrating an example of the configuration of the external storage device as illustrated in FIG. 1. As illustrated in FIG. 3, the external storage device 100 includes a control-data storage unit 110 and an operating-information recording unit 120 in its storage area. In the control-data storage unit 110, data such as a control program for controlling the operation of the air-conditioning apparatus 500 is stored. In the operating-information recording unit 120, operation information, which is information regarding the operating state of the air-conditioning apparatus 500, is recorded.

Figure 4:
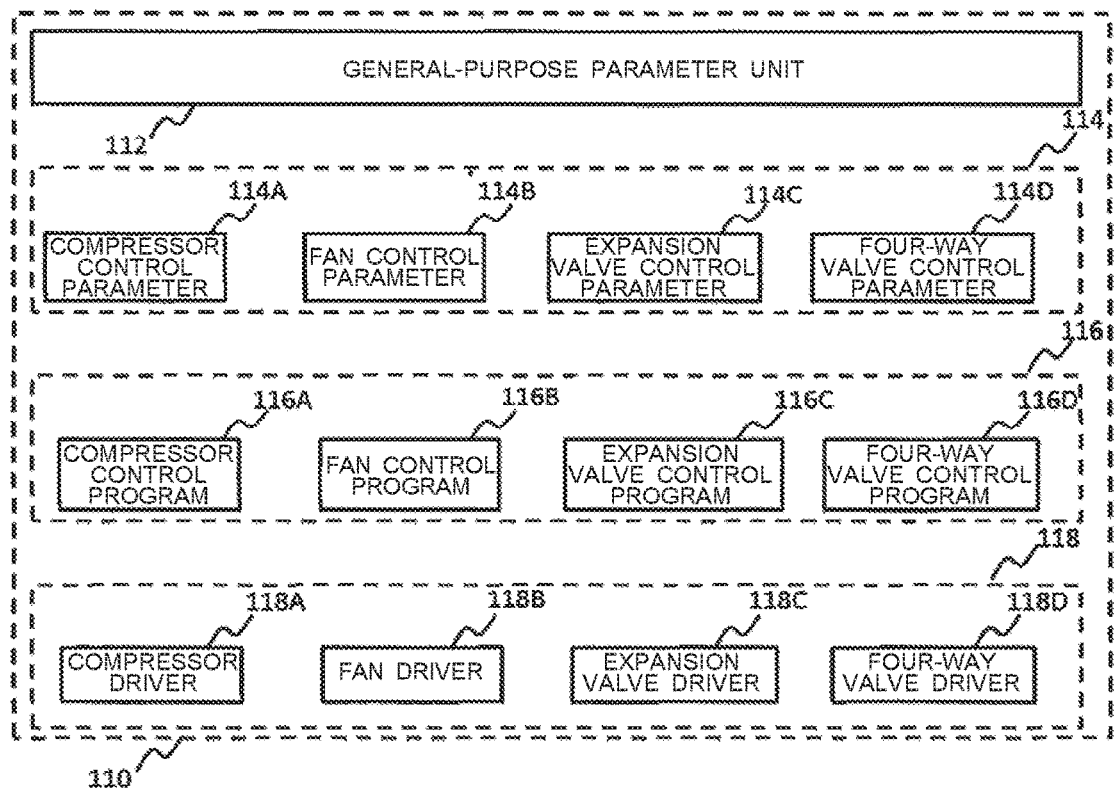
FIG. 4 is a diagram illustrating an example of the configuration of a control-data storage unit as illustrated in FIG. 3.

FIG. 4 is a diagram illustrating an example of the configuration of the control-data storage unit as illustrated in FIG. 3. As illustrated in FIG. 4, the control-data storage unit 110 includes a general parameter unit 112, a control parameter unit 114, a control program unit 116 and a driver software unit 118.

The general parameter unit 112 stores information which specifies the overall configuration of the air-conditioning apparatus 500. The general parameter unit 112 includes information for specifying, for example, the type of air-conditioning apparatus 500, the type of refrigerant, types of connected devices and a combination thereof, etc. As the types of air-conditioning apparatus 500, for example, air-conditioning apparatuses made to standard specifications, cold-region specifications, refrigerator specifications, general building specifications and water air-conditioning specifications are present. As the types of refrigerant, for example, R410, R32 and CO2 are present. The combination of the connected devices is, for example, a combination of any of a plurality of types of compressors, any of a plurality of types of fans, any of pipes having different lengths and any of a plurality of types of expansion valves. On the basis of the outdoor-unit connected-device information, the indoor-unit connected-device information and the information stored by the general parameter unit 112, the overall configuration of the air-conditioning apparatus 500 is specified. The information in the general parameter unit 112 is set in advance.

The control parameter unit 114 stores parameters for providing control suitable for the specifications of devices to be controlled. The control parameter unit 114 includes a compressor control parameter 114A, a fan control parameter 114B, an expansion valve control parameter 114C and a four-way valve control parameter 114D.

In order to control the devices, the control program unit 116 stores respective control programs for controlling the devices. The control program for each of the devices is specified using a parameter acquired from the control parameter unit 114. The control program unit 116 includes a compressor control program 116A, a fan control program 116B, an expansion valve control program 116C and a four-way valve control program 116D.

The driver software unit 118 stores driver software programs which serve as interfaces between the control programs stored by the control program unit 116 and the devices. The driver software unit 118 includes a compressor driver 118A, a fan driver 118B, an expansion valve driver 118C and a four-way valve driver 118D.

It should be noted that although it is not illustrated in FIG. 4, with respect to each of the devices, the control program unit 116 may also store a standard program not depending on a control parameter. In this case, the external storage device 100 can provide the standard program to an unregistered one of the devices provided in the air-conditioning apparatus 500, for which a control program associated with a control parameter for the unregistered device itself is not stored in the control program unit 116. Additionally, the control program unit 116 may also store a learning mode program for causing the controller 202 to operate in a learning mode. The learning mode is a mode for optimizing, for example, a refrigeration cycle control. Also, although FIG. 4 illustrates the control programs and the driver software separately, these control programs may also include the driver software.

Figure 5:
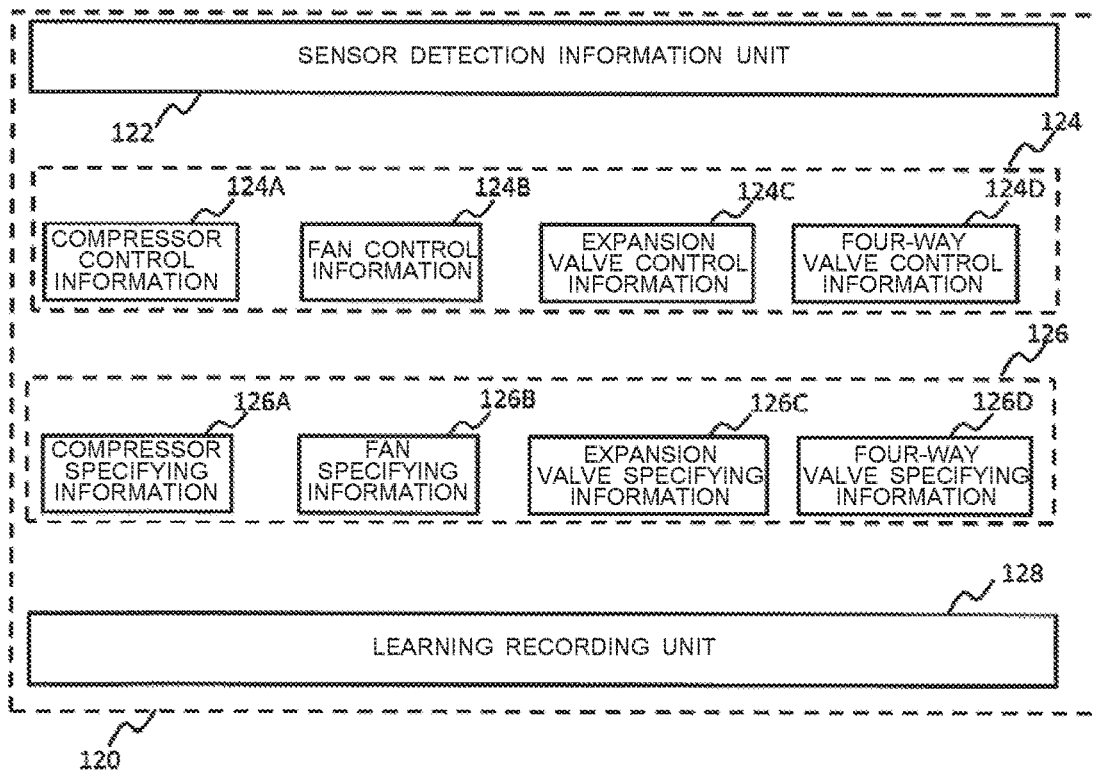
FIG. 5 is a diagram illustrating an example of the configuration of an operating-information recording unit as illustrated in FIG. 3.

FIG. 5 is a diagram illustrating an example of the configuration of the operating-information recording unit as illustrated in FIG. 3. As illustrated in FIG. 5, the operating-information recording unit 120 includes a sensor detection information unit 122, a control information unit 124, a connected-device specifying unit 126 and a learning recording unit 128.

The sensor detection information unit 122 records the result of detection which is performed by each of the outdoor temperature sensor 214, the discharge-port pressure sensor 216, the suction-port pressure sensor 218 and the indoor temperature sensor 312 during the operation of the air-conditioning apparatus 500. The control information unit 124 records the control state of each of the fan 206, the four-way valve 210, the compressor 212, the fan 306 and the expansion valve 310 during the operation of each of these devices. The control state is, for example, the amount of control. As illustrated in FIG. 5, the control information unit 124 records compressor control information 124A, fan control information 124B, expansion valve control information 124C, and four-way valve control information 124D as control information regarding the devices.

The connected-device specifying unit 126 records information for specifying each of the devices to be controlled in accordance with control programs, such as the compressor 212 and the expansion valve 310, and each of the sensors, such as the outdoor temperature sensor 214. In the connected-device specifying unit 126, for example, the outdoor-unit connected-device information and the indoor-unit connected-device information are stored. FIG. 5 illustrates compressor specifying information 126A, fan specifying information 126B, expansion valve specifying information 126C and four-way valve specifying information 126D which are stored in the connected-device specifying unit 126, as information for specifying devices to be controlled in accordance with control programs. The information stored in the connected-device specifying unit 126 is associated with data recorded in the sensor detection information unit 122 and the control information unit 124, and the controller 202 thus recognizes which of the devices the recorded data is associated with. On the basis of the data recorded in the sensor detection information unit 122 and the control information unit 124, the learning recording unit 128 records information on optimal values obtained by learning regarding the air-conditioning apparatus 500.

Next, an example of the control programs stored in the control program unit 116 as illustrated in FIG. 4 will be specifically described. FIG. 6 is a diagram illustrating an example of control programs prepared as control programs to be stored in the external storage device as illustrated in FIG. 1.

In the example illustrated in FIG. 6, compressor control programs 116A1 to 116A3 are prepared as the compressor control program 116A as illustrated in FIG. 4. The compressor control programs 116A1 to 116A3 are prepared by modifying the standard program in accordance with the types of compressors. The numbers 1 to 3 denote respective modification numbers. Fan control programs 116B1 to 116B3 are prepared as the fan control program 116B. Expansion valve control programs 116C1 to 116C3 are prepared as the expansion valve control program 116C. Four-way valve control programs 116D1 to 116D3 are prepared as the four-way valve control program 116D.

Of the prepared control programs, for example, the compressor control program 116A1, the fan control program 116B1, the expansion valve control program 116C1 and the four-way valve control program 116D1 are stored in the control program unit 116 of the external storage device 100. The control programs for the devices, which are stored in the control program unit 116, do not necessarily have to have the same modification number. For example, the compressor control program 116A2, the fan control program 116B1, the expansion valve control program 116C3 and the four-way valve control program 116D1 may also be stored in the control program unit 116. With respect to each of the devices provided in the air-conditioning apparatus 500, a control program is selected in accordance with the type of each device.

FIG. 7 is a diagram illustrating another example of the control programs stored in the external storage device as illustrated in FIG. 1. FIG. 7 illustrates control programs selected for each of a plurality of specifications which are present as the specifications of the air-conditioning apparatus 500. In the air-conditioning apparatus 500 made to standard specifications, the compressor control program 116A1, the fan control program 116B1, the expansion valve control program 116C1 and the four-way valve control program 116D1 are selected. In the air-conditioning apparatus 500 made to cold region specifications, the compressor control program 116A1, the fan control program 116B1, the expansion valve control program 116C2 and the four-way valve control program 116D2 are selected. In the air-conditioning apparatus 500 made to refrigerator specifications, the compressor control program 116A2, the fan control program 116B1b, the expansion valve control program 116C2, and the four-way valve control program 116D2 are selected. The fan control program 116B1b is prepared by modifying the fan control program 116B1.

The above description referring to FIG. 6 is made with respect to the case where a single control program is selected from a plurality of kinds of control programs in accordance with the type of a device. FIG. 7 shows that for a single type of device, a single control program is selected from a plurality of kinds of control programs in accordance with the specifications of the air-conditioning apparatus 500. In such a manner, a control program is selected in units of one device in accordance with the specifications of the air-conditioning apparatus 500. Thus, it is not necessary to create a new overall program which conforms to the specifications. It is therefore possible to easily increase the number of models of air-conditioning apparatuses 500.

Figure 8:
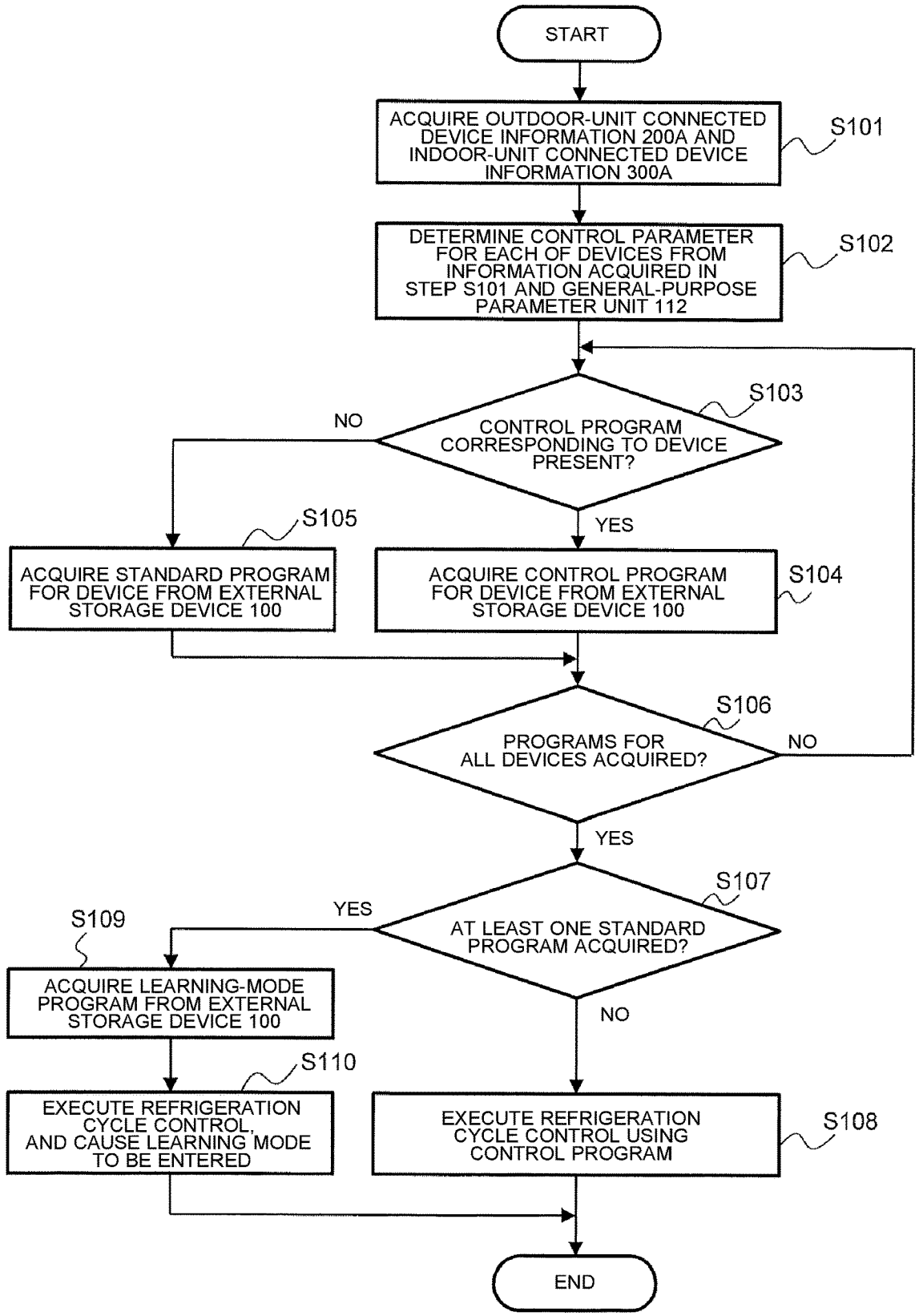
FIG. 8 is a flowchart illustrating an operation procedure of the air-conditioning apparatus according to embodiment 1 of the present invention.

Next, the operations of the air-conditioning apparatus 500 according to embodiment 1 will be described. FIG. 8 is a flowchart illustrating an operation procedure of the air-conditioning apparatus according to embodiment 1 of the present invention.

When the external storage device 100 is connected to the controller 202, the program organizer 25 reads out the outdoor-unit connected-device information from the memory 21. Also, using the communication unit 204 and the communication unit 304, the program organizer 25 notifies the controller 302 that the external storage device 100 has been connected to the controller 202. When notified by the controller 202 that the external storage device 100 has been connected thereto, the controller 302 reads out the indoor-unit connected-device information from the memory 31. The controller 302 transmits the read-out indoor-unit connected-device information to the controller 202 using the communication unit 304 and the communication unit 204. The program organizer 25 acquires the indoor-unit connected-device information which is transmitted from the controller 302 using the communication unit 204 and the communication unit 304 (step S101).

The program organizer 25 stores the outdoor-unit connected-device information and the indoor-unit connected-device information in the connected-device specifying unit 126 in the external storage device 100. Furthermore, the program organizer 25 accesses the control parameter unit 114 in the external storage device 100, and determines control parameters for the devices provided in the air-conditioning apparatus 500, based on the outdoor-unit connected-device information, the indoor-unit connected-device information and the information stored by the general parameter unit 112 (step S102).

Subsequently, the program organizer 25 determines whether the configuration of the air-conditioning apparatus 500 which is specified based on the outdoor-unit connected-device information and the indoor-unit connected-device information is the same as that stored in the general parameter unit 112 or not. As a result, if it is determined that the configuration of the air-conditioning apparatus 500 is the same as that stored in the general parameter unit 112, it means that control programs associated with the devices provided in the air-conditioning apparatus 500 are stored in the external storage device 100. The program organizer 25 accesses the external storage device 100, and with respect to each of the devices, determines whether a control program associated with the control parameter determined in step S102 is stored in the external storage device 100 or not (step S103), and if a control program associated with each device is stored in the external storage device 100, the program organizer 25 acquires the control program from the external storage device 100, and stores the control program in the memory 21 (step S104).

On the other hand, in the case where it is determined in step S103 that the configuration of the air-conditioning apparatus 500 is different from that stored in the general parameter unit 112, the program organizer 25 cannot acquire a control program for an unregistered device, and thus acquires the standard program from the external storage device 100 (step S105).

For each of all the devices, the program organizer 25 determines whether a program is acquired from the external storage device 100 or not (step S106). In the case where acquisition of programs for all the devices is ended, the program organizer 25 determines whether the acquired programs include a standard program or not (step S107). In the case where the acquired programs are all control programs, the program organizer 25 organizes a refrigeration-cycle control program incorporating all of the control programs stored in the memory 21.

The refrigeration cycle control unit 26 executes the refrigeration-cycle control program organized by the program organizer 25 (step S108). The refrigeration cycle control unit 26 may also cause the refrigeration cycle control unit 36 to execute control programs in the refrigeration-cycle control program, that are ones for devices provided in the indoor unit 300. For example, if the refrigeration-cycle control program is considered as a main program, and the control programs for the devices are considered as sub-programs, the refrigeration cycle control unit 26 is able to cause the refrigeration cycle control unit 36 to execute some sub-programs included in the main program. The refrigeration cycle control unit 26 executes the control program for each of the devices provided in the outdoor unit 200, and the refrigeration cycle control unit 36 executes the control program for each of the devices provided in the indoor unit 300. Thereby, the refrigeration cycle control units 26 and 36 can perform a refrigeration cycle control related to the air-conditioning apparatus 500, on the basis of the information stored in the general parameter unit 112.

By contrast, as the result of determination in step S107, if the acquired programs includes even a single standard program, the program organizer 25 acquires the learning mode program from the external storage device 100 (step S109). Subsequently, the refrigeration cycle control units 26 and 36 perform the refrigeration cycle control using the control programs and the standard program, and also apply a learning mode using the learning mode program (step S110).

In the learning mode, the refrigeration cycle control unit 26 acquires detection values from the sensors, records the detection values in the sensor detection information unit 122, and also records a control state in the control information unit 124. The refrigeration cycle control unit 26 calculates a power consumption and a refrigeration capacity at regular intervals on the basis of the recorded detection values obtained from the sensors and the recorded control state, and records information for optimally controlling the refrigeration cycle, which is obtained based on the result of the calculation, in the learning recording unit 128. Furthermore, the refrigeration cycle control unit 26 uses information recorded in the learning recording unit 128 as an input value, and executes the standard program for the unregistered device. It should be noted that the refrigeration cycle control unit 26 may also use the information recorded in the learning recording unit 128 as an input value for the control programs.

As described with reference to FIG. 8, in the case where the external storage device 100 is set in the air-conditioning apparatus 500, it is possible to cause the air-conditioning apparatus 500 to read out programs from the external storage device 100 and execute the refrigeration cycle control.

It should be noted that in the case where the controller 302 is provided with the program organizer 25, it may execute the processes of steps S101 to S107 and S109 indicated in FIG. 8. Also, based on device information and the information stored in the general parameter unit 112, the program organizer 25 determines control parameters for the devices, referring to the control parameter unit 114; however, in the case where the control parameters for the devices can be specified based on the device information, the program organizer 25 may determine the control parameters without using the information stored in the general parameter unit 112. Furthermore, although it is described above that the program organizer 25 starts processing the flow of which is indicated in FIG. 8 when the external storage device 100 is connected to the controller 202, but the timing of starting the processing is not limited to the above case. For example, after the external storage device 100 is connected to the controller 202, when a worker inputs an instruction to start the processing using an operation unit not illustrated, the program organizer 25 may start the processing the flow of which is indicated in FIG. 8. Although it is described above with reference to FIG. 8 that control programs for a plurality of devices are read out, the number of devices may be one. This can be considered true of, for example, the process of updating the control program for a single device, which is included in the entire refrigeration-cycle control program.

With respect to embodiment 1, it is described above that the external storage device 100 stores the learning mode program. However, a failure inspection program for detecting an abnormality in any of devices to be controlled may also be stored. In this case, when connection of the external storage device 100 is effected, the program organizer 25 reads out the failure inspection program from the external storage device 100 and stores the failure inspection program in the memory 21. The refrigeration cycle control unit 26 executes the failure inspection program stored in the memory 21, and can inspect whether an abnormality occurs in each of the devices or not. For example, the refrigeration cycle control unit 26 monitors the value of detection by the discharge-port pressure sensor 216, and compares the detection value to a predetermined threshold value, and can thus determine that an abnormality occurs in the compressor 212 when the detection value becomes higher than the threshold value.

With respect to embodiment 1, it is described above that the memories 21 and 31 store in advance device information regarding the devices related to the refrigeration cycle, however, this is not limitative. The controller 202 may also automatically recognize those devices related to the refrigeration cycle, that are provided in the air-conditioning apparatus 500, acquire device information from each of the devices, and store the acquired device information in the memory 21. Furthermore, in the case where each of the devices is provided with a type specifying unit including a switch or the like for setting the type, the controller 202 may use the type specifying unit to specify the type of each of the devices. The type specifying unit is, for example, a DIP switch. Furthermore, the controller 202 may specify the type of the air-conditioning apparatus 500 on the basis of the device information acquired from each device or information regarding the type of each device which is specified by the type specifying unit, and cause the external storage device 100 to store information related to the specified type of the air-conditioning apparatus 500. The general parameter unit 112 may also be a unit which specifies the entire configuration of the air-conditioning apparatus 500 on the basis of the device information acquired by the controller 202. On the basis of the entire configuration of the air-conditioning apparatus 500 which is specified in the general parameter unit 112, the control parameters and the control programs are determined.

The air-conditioning apparatus 500 according to embodiment 1 includes a plurality of devices including at least the compressor 212, and the controller 202 which stores device information indicating the type of each of the devices. The controller 202 includes the program organizer 25 which reads out a control parameter and a control program associated with a device on the basis of device information from the external storage device 100 which stores control parameters and control programs associated with the respective devices, and the refrigeration cycle control unit 26 which controls a device in accordance with a control program read out by the program organizer 25.

According to embodiment 1, control parameters and control programs associated with the devices provided in the air-conditioning apparatus 500 can be read out from the external storage device 100 on the basis of the device information. It is therefore possible to easily change the program related to refrigeration cycle control by changing the control program associated with a device, that needs to be changed, thus enabling the number of models of air-conditioning apparatuses to be easily increased.

In the case of creating an overall program each time a new model of air-conditioning apparatus is made, the number of kinds of programs is increased, and as a result the range of part of the overall program which is to be changed is expanded, thus increasing the load of the maintenance and management of the program. In contrast, in embodiment 1, in the case where a new model of air-conditioning apparatus 500 is made, it suffices to crease only a control program associated with a device which needs to be changed, that is, it is not necessary to create an overall program. It is therefore possible to easily increase the number of models of air-conditioning apparatuses, and easily carry out the maintenance and management of the control programs.

Also, the control programs and control parameters are dividedly stored in the external storage device 100 as control programs and control parameters associated with respective devices. It is therefore possible to easily specify part to be changed, and easily change only a program to be changed. It is possible to obtain a program which provide a control according with the specifications of the air-conditioning apparatus 500, simply by changing the combination of control parameters and control programs to be stored in the external storage device 100. If control program patterns are prepared for the same device in advance, it is possible to provide control according with each of a plurality of specifications of air-conditioning apparatuses by simply changing the combination of control programs to be stored in the external storage device 100.

In embodiment 1, if the control programs and the control programs share a common interface, it is possible to easily perform replacement of the control programs and control parameters.

In embodiment 1, even if an unregistered device for which a control program is not stored in the external storage device 100 is present, the unregistered device can be controlled using the standard program, and the control of the unregistered device can be optimized using the learning mode program in accordance with the configuration of the air-conditioning apparatus 500. Furthermore, since the standard program is configured such that it is divided into program parts for the respective devices, the learning mode can be easily applied to each of the devices.

In embodiment 1, in the case where a failure inspection program is stored in the external storage device 100, the controller 202 may also read out the failure inspection program from the external storage device 100, and execute the failure inspection program. In this case, the controller 202 can detect an abnormality which occurs in any of the devices provided in the air-conditioning apparatus 500.

In embodiment 1, it is conceivable that after the external storage device 100 is connected to the air-conditioning apparatus 500 and the control programs are stored therein during manufacturing the air-conditioning apparatus 500, the external storage device 100 is disconnected from the air-conditioning apparatus 500 before shipping the air-conditioning apparatus 500. Furthermore, the air-conditioning apparatus 500 may also be shipped without disconnecting the external storage device 100 therefrom. In this case, since the capacities of storage areas of the memories 21 and 31 provided in the controllers 202 and 302 of the outdoor unit 200 and the indoor unit 300 are limited, the external storage device 100 functions to expand the capacities of the storage areas of the memories 21 and 31. The external storage device 100 can record the operating state of the air-conditioning apparatus 500.

Embodiment 2

In embodiment 2, the external storage device 100 described with respect to embodiment 1 is a removable memory which is removably set in the air-conditioning apparatus 500. The removable memory is, for example, a Universal Serial Bus (USB) memory or a Secure Digital (SD) memory card. The following description is made referring to the case where the removable memory is a USB memory.

Figure 9A:
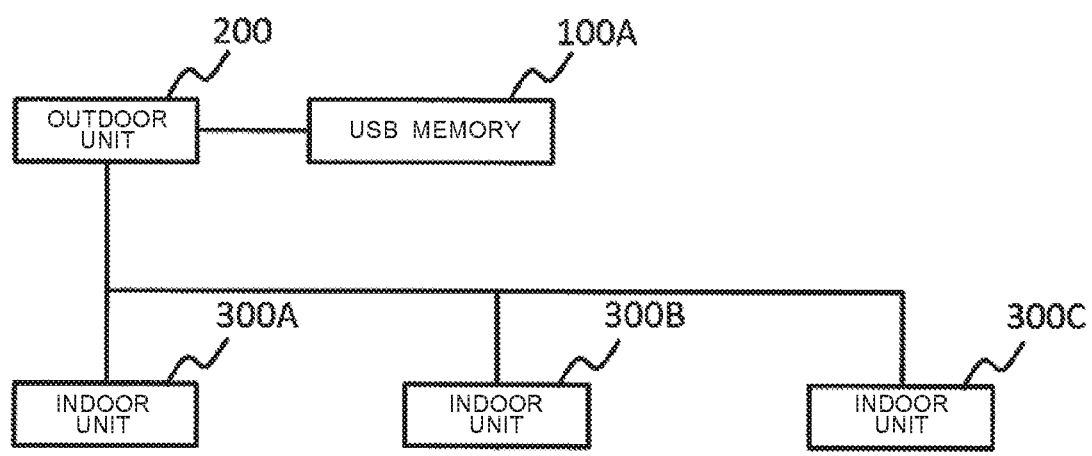
FIG. 9A is a diagram illustrating an example of the configuration of an air-conditioning apparatus according to embodiment 2 of the present invention.

A configuration of the air-conditioning apparatus according to embodiment 2 will be described. In embodiment 2, elements which are the same as those of embodiment 1 will be denoted by the same signs, and their detailed descriptions will be omitted. FIG. 9A is a diagram illustrating an example of the configuration of an air-conditioning apparatus according to embodiment 2 of the present invention.

The indoor units 300A to 300C as illustrated in FIG. 9A each have a configuration which is the same as or similar to that of the indoor unit 300 as described with respect to embodiment 1. The USB memory 100A as illustrated in FIG. 9A corresponds to the external storage device 100 as described regarding embodiment 1. The USB memory 100A includes the control-data storage unit 110 which stores the control parameters or control programs which are provided as illustrated in FIG. 4, and the operating-information recording unit 120 which records the operating state when the air-conditioning apparatus 500 is being operated in accordance with the control programs or the control parameters stored in the memory device of the air-conditioning apparatus 500. In embodiment 2, a USB port not illustrated is provided in the outdoor unit 200. The USB memory 100A is connected to the USB port provided in the outdoor unit 200. The USB memory 100A can exchange information with the controller 202 provided as illustrated in FIG. 1, through the USB port.

In embodiment 2, the external storage device 100 is the USB memory 100A. The user of the air-conditioning apparatus 500 can easily set or remove the USB memory 100A in or from the USB port provided in the outdoor unit 200. Therefore, the user can easily set or remove the external storage device 100.

Figure 9B:
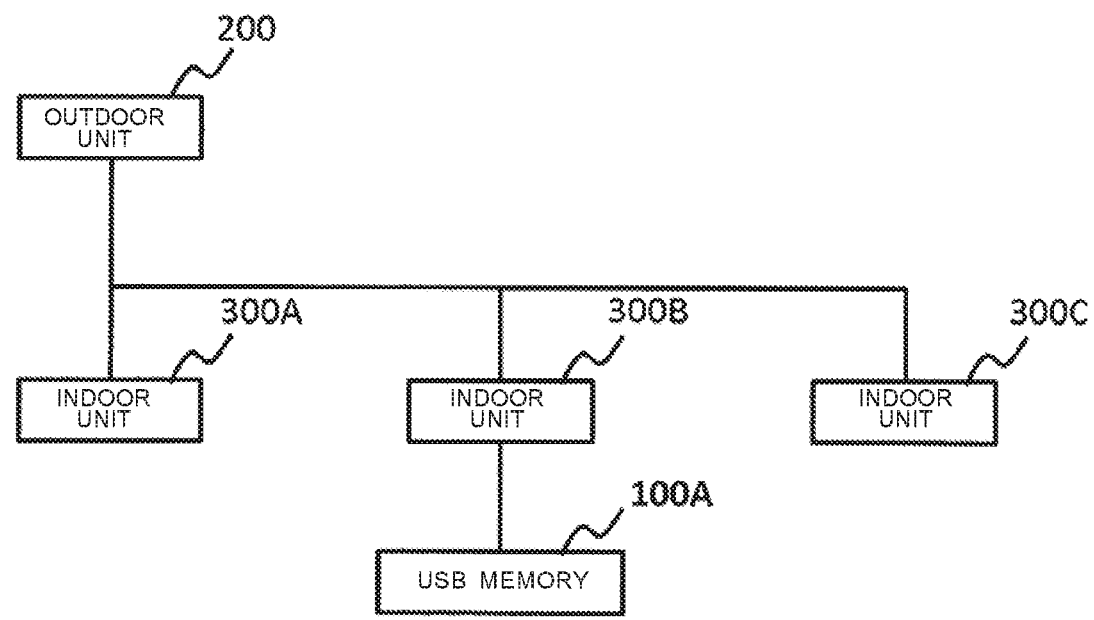
FIG. 9B is a diagram illustrating another example of the configuration of an air-conditioning apparatus according to embodiment 2 of the present invention.

It should be noted that the USB memory 100A may also be connected to any of the indoor units 300A to 300C instead of to the outdoor unit 200. FIG. 9B is a diagram illustrating another example of the configuration of the air-conditioning apparatus according to embodiment 2 of the present invention. A USB port not illustrated is provided in the indoor unit 300B. As illustrated in FIG. 9B, the USB memory 100A is connected to the USB port provided in the indoor unit 300B. In the example of the configuration as illustrated in FIG. 9B, the USB port is provided in the indoor unit 300B, however, the indoor unit including the USB port is not limited to the indoor unit 300B.

Also, in embodiment 2, the USB memory 100A may store the learning mode program and the failure inspection program as optional programs, in addition to data to be stored in the control-data storage unit 110 as illustrated in FIG. 4. Even if the learning mode program and the failure inspection program are not stored in the controller 202 during the manufacturing process of the air-conditioning apparatus 500, the controller 202 can read out those programs from the USB memory 100A and execute the programs after the air-conditioning apparatus 500 is installed.

The optional programs to be stored in the USB memory 100A are not limited to the learning mode program and the failure inspection program. As another optional program, for example, a user-specific program which provides an air-conditioning setting suitable for the user is conceivable. Even if the optional programs such as the user-specific program, the failure inspection program and the learning mode program are stored in respective USB memories 100A, and a USB memory 100A set in the outdoor unit 200 does not store a required optional program, the user can cause the controller 202 to read out the required optional program by simply replacing the USB memory 100A set in the outdoor unit 200 with a USB memory 100A storing the required optional program. It should be noted that, for example, if the indoor units 300A to 300*c* air-condition the same room in interlock with each other, all of the indoor units 300A to 300C can also be caused to execute the optional programs by setting USB memories 100A in the indoor units 300A to 300*c*. Since the indoor units 300A to 300C which performs air-conditioning in interlock with each other execute optional programs in interlock with each other, the control of the air-conditioning apparatus 500 is performed at a higher level.

Furthermore, it is also possible to cause the USB memory 100A to function as a key for operating the air-conditioning apparatus 500. To be more specific, it is conceivable to limit the use of the air-conditioning apparatus 500 in the following manner. For example, a common authentication key is stored in advance in the memory 21 of the controller 202 and the USB memory 100A. When the user connects the USB memory 100A to the outdoor unit 200, the controller 202 executes an authentication process for determining whether or not the authentication key stored by the controller 202 itself is the same as the authentication key stored in the USB memory 100A. As the result of the authentication process, it is determined that these authentication keys are the same as each other, the controller 202 accepts instructions regarding an operation for the air-conditioning apparatus 500. By contrast, in the case where the USB memory 100A is not connected to the outdoor unit, and in the case where it is determined as the result of the authentication process that the authentication keys are not same as each other, the controller 202 does not accept instructions regarding the operation for the air-conditioning apparatus 500. In such a manner, it is possible to prevent the air-conditioning apparatus 500 from being used by a person other than an authorized user.

Also, since the capacities of the storage areas of the memories provided in advance in the outdoor unit 200 and the indoor unit 300 are limited, the USB memory 100A serves to add a further storage capacity to the capacities of the storage areas of the memories in the air-conditioning apparatus 500. For example, a worker can provide a control program of a new operation mode to the air-conditioning apparatus 500, by connecting a USB memory 100A storing the control program to the air-conditioning apparatus 500 after the installation of the air-conditioning apparatus 500. Also, the USB memory 100A can be caused to record data regarding the operating state of the air-conditioning apparatus 500.

If the USB memory 100A is caused to record data regarding the operating state of the air-conditioning apparatus 500, after removing the USB memory 100A from the outdoor unit 200, the user can analyze the recorded data using an information processing device such as a computer. If the USB memory 100A stores control programs and record of control information in association with each other, the user can obtain detailed data such as response data regarding the execution of control.

Various modifications of the air-conditioning apparatus according to embodiment 2 described above are conceivable. The following description is made by referring to modifications of the air-conditioning apparatus according to embodiment 2.

(Modification 1)

Figure 10:
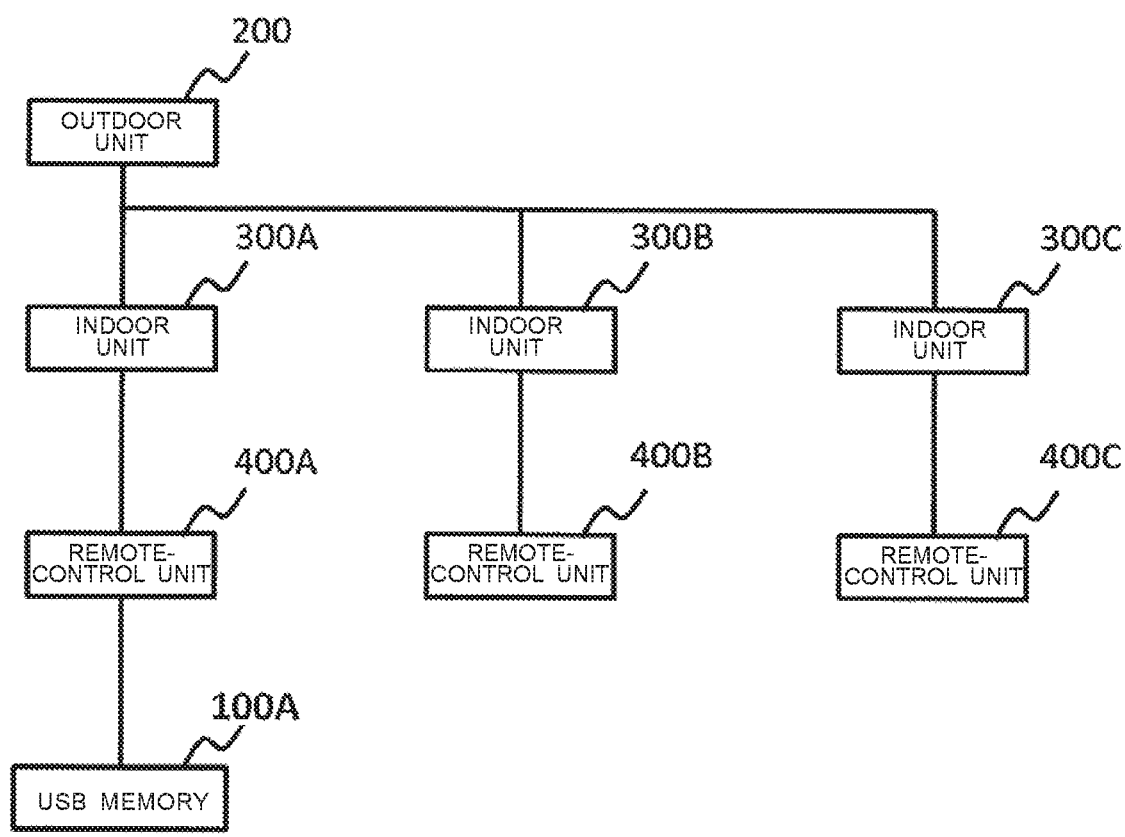
FIG. 10 is a diagram illustrating modification 1 of the air-conditioning apparatus according to embodiment 2 of the present invention.
Figure 11:
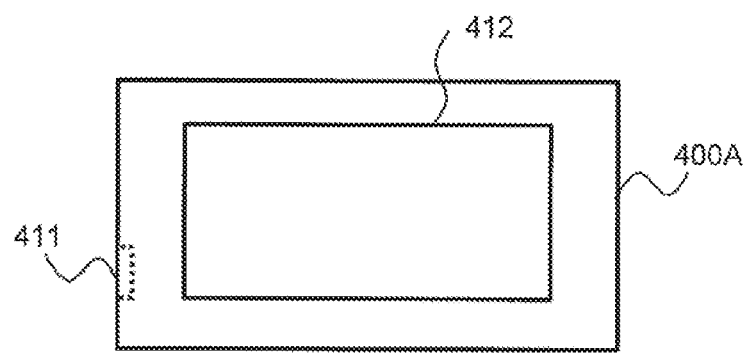
FIG. 11 is a front exterior view illustrating an example of the configuration of the remote control unit as illustrated in FIG. 10.

FIG. 10 is a diagram illustrating modification 1 of the air-conditioning apparatus according to embodiment 2 of the present invention. FIG. 11 is a front external view of an example of the configuration of a remote control unit as illustrated in FIG. 10. In modification 1, as illustrated in FIG. 10, remote control units 400A to 400C are connected to the indoor units 300A to 300C. As illustrated in FIG. 11, a USB port 411 is provided in the remote control unit 400A. The USB port 411 is provided in, for example, a side surface of the remote control unit 400A. Also, the remote control unit 400A includes a display unit 412 which makes a display.

When the USB memory 100A is connected to the USB port 411 provided in the remote control unit 400A, the USB memory 100A can communicate with the indoor unit 300A and the outdoor unit 200, using the remote control unit 400A. When recognizing that the USB memory 100A is connected to the USB port 411, the controller 202 may also cause the display unit 412 to display a message indicating that the USB memory 100A is set. Furthermore, the controller 202 may read out information stored in the USB memory 100A therefrom through the USB port 411, and cause the display unit 412 to display the information. For example, the display unit 412 may display information related to the control parameters and the control programs which are provided as illustrated in FIG. 4.

The remote control unit 400A is provided, for example, on a wall in the room, such that it can be easily operated by the user of the air-conditioning apparatus 500. Thus, if the USB port 411 is provided in the remote control unit 400A, the user can easily set or remove the USB memory 100A in or from the USB port 411. Therefore, using the USB memory 100A, the user can easily replace the program stored in the air-conditioning apparatus 500 with another one. Also, the operating state of the air-conditioning apparatus 500 can be easily recorded in the USB memory 100A.

It should be noted that the remote control unit including the USB port 411 is not limited to the remote control unit 400A. It suffices that the USB port 411 is provided in at least one of the remote control units 400A to 400C. This is because the USB memory 100A can be connected from any of the remote control units 400A to 400C to the outdoor unit 200 through the indoor units 300A to 300C. Furthermore, although the above description refers to the case where the controller 202 controls the display unit 412 and a device connected to the USB port 411, the display unit and the device can be controlled by the controller 302 of the indoor unit 300A, or by a controller provided in the remote control unit 400A, such as a microcontroller provided therein. Furthermore, the remote control units 400B and 400C, as well as the remote control unit 400A, may also each include the display unit 412.

(Modification 2)

Figure 12:
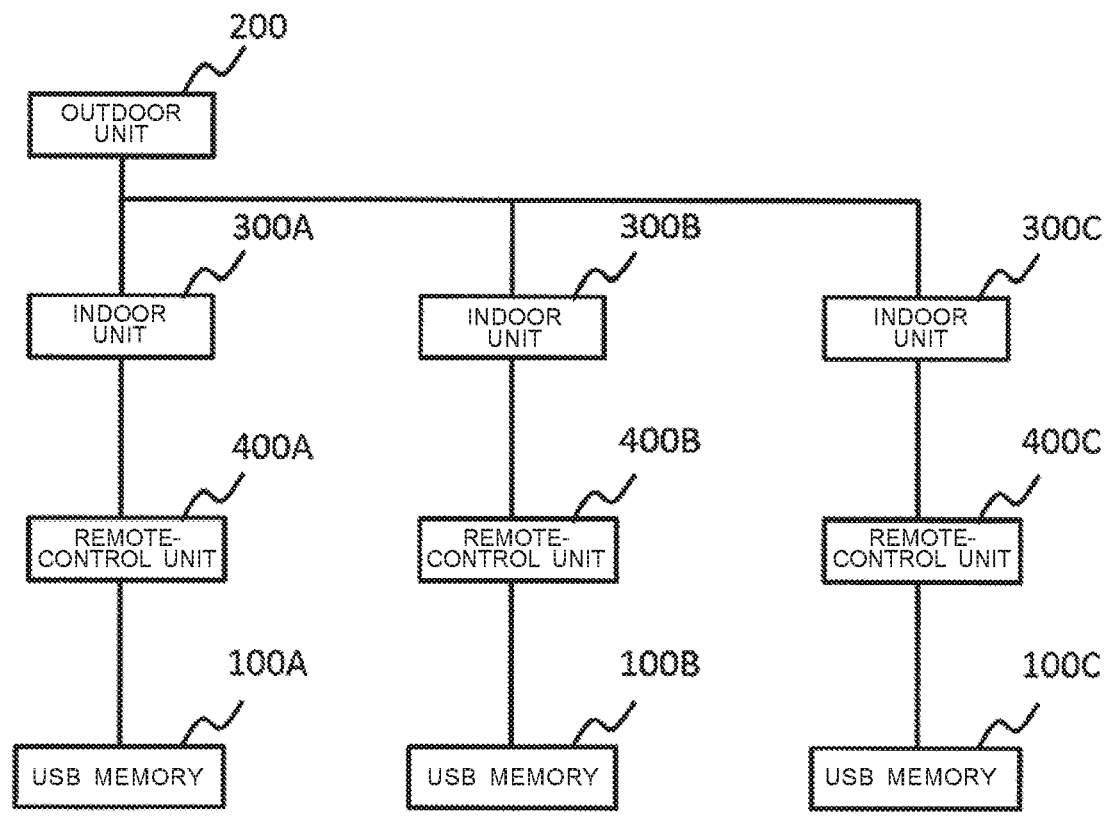
FIG. 12 is a diagram illustrating modification 2 of the air-conditioning apparatus according to embodiment 2 of the present invention.

FIG. 12 is a diagram illustrating modification 2 of the air-conditioning apparatus according to embodiment 2 of the present invention. In modification 2, the USB port 411 as illustrated in FIG. 11 is provided in each of the remote control units 400A to 400C. Each of the USB memories 100A to 100C as illustrated in FIG. 12 corresponds to the external storage device 100 described with respect to embodiment 1. The USB memories 100A to 100C are connected to USB ports provided in the remote control units 400A to 400C, respectively. The USB memories 100A to 100C can communicate with the outdoor unit 200 through the remote control units 400A to 400C and the indoor units 300A to 300C.

In the case where the outdoor unit 200 is connected to USB memories 100A to 100C as in modification 2, priorities are assigned to the memories in advance. The program organizer 25 of the controller 202 reads out control programs from the USB memory having the highest priority. The USB memory having the highest priority is possessed by an administrator who manages, for example, an environment which is under an air-conditioning control by the air-conditioning apparatus 500.

For example, with respect to the USB memories 100A to 100C, it is assumed that the USB memory 100A is the memory having the highest priority. In this case, the other two USB memories, that is, the USB memories 100B and 100C, function mainly to collect data related to the operating state of the air-conditioning apparatus 500. The USB memory 100A may also collect data related to the operating state. Furthermore, the USB memory 100B and 100C function as backup memories in the case where a failure occurs in the USB memory 100A.

The USB memories 100A to 100C can also record data related to the comfortability for the users of the indoor units 300A to 300C, respectively. In this case, by utilizing the recorded data, the administrator can provide each user with a delicate air-conditioned state suited to the comfortability therefor. For example, it is conceivable that as an optional program, the administrator stores in the USB memory 100A, a user-specific program which provides an air-conditioning setting which vary in accordance with the difference in, for example, sex and age, between the users.

(Modification 3)

The air-conditioning apparatus 500 according to modification 3 will be described with reference to FIG. 12. In the air-conditioning apparatus 500 according to modification 3, as illustrated in FIG. 12, the USB memories 100A to 100C are connected to the remote control units 400A to 400C, respectively. Each of the USB memories 100A to 100C includes control-data storage units 110 which are provided for respective devices.

For example, the USB memory 100A stores a plurality of kinds of control parameters and control programs for the compressor 212. The USB memory 100B stores a plurality of kinds of control parameters and control programs for the fans 206 and 306. The USB memory 100C stores a plurality of control parameters and control programs for the expansion valve 310 and the four-way valve 210.

Next, the operation of the air-conditioning apparatus 500 according to modification 3 will be described with reference to FIG. 8. In step S101 as indicated in FIG. 8, the controller 202 specifies devices included in the air-conditioning apparatus 500 from acquired outdoor-unit connected-device information and indoor-unit connected-device information. In steps S102 to S104, the controller 202 searches the USB memories 100A to 100C to determine control parameters for the devices specified in step S102, and acquires the control parameters. In the example described above, a control program for the compressor 212 is selected from the control programs stored in the USB memory 100A, and control programs for the fans 206 and 306 are selected from the control programs stored in the USB memory 100B.

Even if a combination of control parameters and control programs is dividedly in a plurality of USB memories, the controller 202 can selectively read out control programs associated with the devices provided in the air-conditioning apparatus 500 by searching the plurality of USB memories.

It should be noted that the manner of storing data in the multiple USB memories is not limited to that of the above case in which data for each of the devices is stored in an associated one of the memories. For example, control parameters and control programs for the devices may also be stored in different USB memories which are provided for respective specifications as illustrated in FIG. 7.

Embodiment 3

Figure 13:
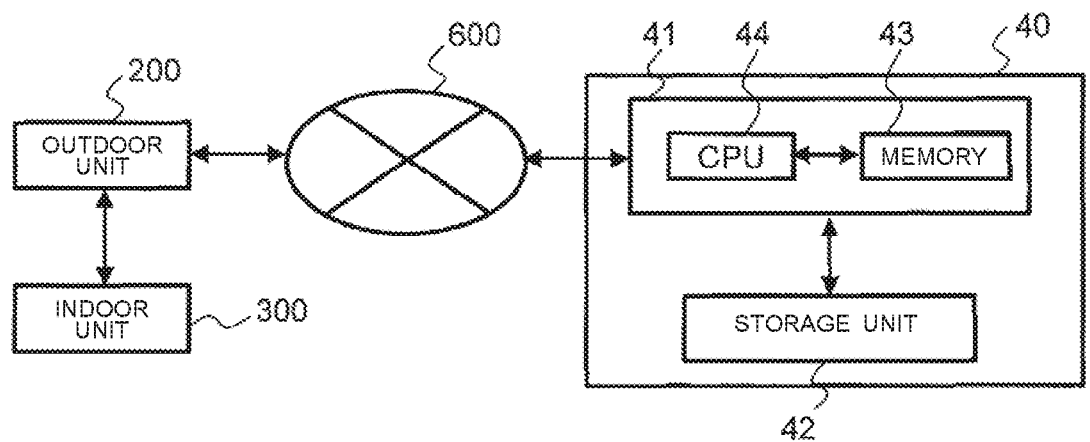
FIG. 13 is a diagram illustrating an example of the configuration of an air-conditioning apparatus according to embodiment 3 of the present invention.

In embodiment 3, the external storage device is connected to a network. FIG. 13 is a diagram illustrating an example of the configuration of an air-conditioning apparatus according to embodiment 3 of the present invention.

In embodiment 3, as illustrated in FIG. 13, the outdoor unit 200 is connected to a server 40 via a network 600. The server 40 includes a controller 41 and a storage unit 42. The controller 41 is a configuration including a memory 43 which stores programs and a CPU 44 which executes processing in accordance with a program. The storage unit 42 is the external storage device 100 as described with respect to embodiment 1. The network 600 is, for example, the Internet. The server 40 and the controller 202 of the outdoor unit 200 holds mutual network identifiers in advance, and communicate with each other using the Transmission Control Protocol/Internet Protocol (TCP/IP) as a communication protocol.

In embodiment 3, after the air-conditioning apparatus 500 is installed, the server 40 can provide control programs for the devices provided in the air-conditioning apparatus 500 to the air-conditioning apparatus 500 via the network 600. Also, in the case of changing the specifications of the air-conditioning apparatus 500, the server 40 communicates with the air-conditioning apparatus 500 via the network 600, whereby the control program for each of the devices can be replaced with a control program suited to the changed specifications. When providing a control program for a device or replacing it with another one, a worker has only to input an instruction for providing or replacing the program, by operating the server 40, that is, the worker does not need to go to the place where the air-conditioning apparatus 500 is installed. Accordingly, the work efficiency is improved.

Furthermore, the worker can easily change a control program for a single device which is included in any of a plurality of air-conditioning apparatuses 500 installed, in the following manner. For example, if finding a bug in the control program for a single device in one of the installed air-conditioning apparatuses 500, the worker creates an updated control program excluding the bug. Then, the worker stores the updated control program in the server 40 and inputs to the server 40 an instruction for replacing the control program including the bug with the updated control program in the plurality of air-conditioning apparatuses 500. The server 40 communicates with the plurality of air-conditioning apparatuses 500, and replaces the control program including the bug with the updated control program. In such a manner, information regarding a failure found in one of the air-conditioning apparatuses 500 can be fed back to the plurality of air-conditioning apparatuses 500.

REFERENCE SIGNS LIST 21, 31, 43 memory 22, 32, 44 CPU 25 program organizer 26, 36 refrigeration cycle control unit 40 server 41 controller 42 storage unit 100 external storage device 100A to 100C USB memory 110 control-data storage unit 112 general parameter unit 114 control parameter unit 114A compressor control parameter 114B fan control parameter 114C expansion valve control parameter 114D four-way valve control parameter 116 control program unit 116A, 116A1 to 116A3 compressor control program 116B, 116B1 to 116B3, 116b1b fan control program 116C, 116C1 to 116C3 expansion valve control program 116D, 116D1 to 116D3 four-way valve control program 118 driver software unit 118A compressor driver 118B fan driver 118C expansion valve driver 118D four-way valve driver 120 operating-information recording unit 122 sensor detection information unit 124 control information unit 124A compressor control information 124B fan control information 124C expansion valve control information 124D four-way valve control information 126 connected-device specifying unit 126A compressor specifying information 126B fan specifying information 126C expansion valve specifying information 126D four-way valve specifying information 128 learning recording unit 200 outdoor unit 202, 302 controller 204, 304 communication unit 206, 306 fan 208 heat-source-side heat exchanger 210 four-way valve 212 compressor 214 outdoor temperature sensor 216 discharge-port pressure sensor 218 suction-port pressure sensor 300, 300A to 300C indoor unit 308 load-side-heat exchanger 310 expansion valve 312 indoor temperature sensor 400A to 400C remote control unit 411 USB port 412 display unit 500 air-conditioning apparatus 600 network

The invention claimed is:

1. An air-conditioning apparatus comprising:
a plurality of devices including at least a compressor; and
a controller configured to
store device information indicating kinds of the plurality of devices,
read out a control parameter and a control program for a particular device, which is included in the plurality of devices, and indicated in kind by the device information of the particular device, from an external storage configured to store a control parameter and a control program for each of the plurality of devices, and
control the particular device in accordance with the read-out control program, wherein:
the external storage is configured to further store a learning mode program configured to optimize a refrigeration cycle control and a plurality of standard programs related to control of the plurality of devices,
the controller reads out, when the plurality of devices includes an unregistered device for which a control program associated with a specified control parameter is not stored in the external storage, a standard program for the unregistered device and the learning mode program from the external storage, the standard program being included in the plurality of standard programs, and
the controller executes the read-out standard program and learning mode program to control the unregistered device.

2. The air-conditioning apparatus of claim 1, wherein the controller accesses the external storage, reads out the control parameter for the particular device based on the device information, and reads out the control program associated with the read-out control parameter from the external storage.

3. The air-conditioning apparatus of claim 1, wherein:
the external storage is configured to further store information regarding a type of the air-conditioning apparatus, and
the controller is configured to read out the control parameter for the particular device based on the device information and the information regarding the type of the air-conditioning apparatus.

4. The air-conditioning apparatus of claim 1, wherein the controller is configured to specify a control parameter for the each of the plurality of devices from a plurality of the control parameters based on the device information.

5. The air-conditioning apparatus of claim 1, wherein:
the external storage is configured to further store a failure inspection program configured to detect an abnormality in the particular device,
the controller is configured to read out the failure inspection program if the external storage stores the failure inspection program, and
the controller is configured to execute the read-out failure inspection program.

6. The air-conditioning apparatus of claim 1, wherein the external storage includes removable memory which is removably set in the air-conditioning apparatus.

7. The air-conditioning apparatus of claim 6, wherein the removable memory is configured to store the control parameters or the control programs, and record an operating state in which the air-conditioning apparatus is when the air-conditioning apparatus is operating in accordance with the control parameters or the control programs stored in the removable memory.

8. The air-conditioning apparatus of claim 6, further comprising:
a remote controller provided with a display configured to make a display, the remote controller being configured to control the air-conditioning apparatus.

9. The air-conditioning apparatus of claim 8, wherein the display is configured to make a display indicating that the removable memory is set, when the removable memory is set.

10. The air-conditioning apparatus of claim 8, wherein the display is configured to display information related to the control parameters or the control programs stored in the removable memory, when the removable memory is set.

11. The air-conditioning apparatus of claim 1, wherein:
the external storage is a storage included in a server connected to a network, and
the controller is connected to the server through the network.

* * * * *